(12) United States Patent
Zehler et al.

(10) Patent No.: US 9,747,768 B1
(45) Date of Patent: Aug. 29, 2017

(54) SYSTEM AND METHOD FOR PROVING PHYSICAL PRESENCE

(71) Applicant: Xerox Corporation, Norwalk, CT (US)

(72) Inventors: Peter J. Zehler, Penfield, NY (US);
Gavan Tredoux, Penfield, NY (US);
Premkumar Rajendran, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/053,295

(22) Filed: Feb. 25, 2016

(51) Int. Cl.
| | |
|---|---|
| H04L 29/06 | (2006.01) |
| G08B 13/24 | (2006.01) |
| G06K 19/077 | (2006.01) |
| G06K 7/10 | (2006.01) |
| G06K 19/06 | (2006.01) |
| H04L 9/08 | (2006.01) |
| H04L 9/32 | (2006.01) |

(52) U.S. Cl.
CPC ..... *G08B 13/2462* (2013.01); *G06K 7/10158* (2013.01); *G06K 7/10475* (2013.01); *G06K 7/10821* (2013.01); *G06K 19/06028* (2013.01); *G06K 19/06037* (2013.01); *G06K 19/07758* (2013.01); *H04L 9/088* (2013.01); *H04L 9/3247* (2013.01)

(58) Field of Classification Search
CPC .......... H04L 63/107; H04L 9/3247; G06F 2221/2111; H04W 12/06; H04W 12/08; G06K 7/10475; G06K 7/10158; G06K 7/10821; G06K 19/07758; G06K 19/06028; G06K 19/06037
See application file for complete search history.

(56) References Cited

U.S. PATENT DOCUMENTS

| | | | |
|---|---|---|---|
| 7,688,794 B2 | 3/2010 | Tredoux et al. | |
| 7,839,523 B2 | 11/2010 | Tredoux et al. | |
| 8,143,996 B2 | 3/2012 | Sarangapani et al. | |
| 8,229,458 B2 | 7/2012 | Busch | |

(Continued)

FOREIGN PATENT DOCUMENTS

| | | |
|---|---|---|
| EP | 2420854 | 2/2012 |
| WO | 2013072437 | 5/2013 |
| WO | 2013121356 | 8/2013 |

*Primary Examiner* — Minh Dinh
(74) *Attorney, Agent, or Firm* — Gibb & Riley, LLC (57) ABSTRACT

Methods and systems receive location identification tokens from transmitters using a portable computerized device. A first location identification token is received from a first location transmitting device, while the portable computerized device is within a predetermined distance from a designated location. A second location identification token is received from a second location transmitting device. A current location signature is calculated using the first and second location identification tokens. A previously stored location signature associated with the first and second location identification tokens is obtained from a computer readable storage medium. The current location signature is compared with the previously stored location signature to determine a similarity measure. The location identification tokens and the current location signature are stored in a memory and transmitted to a server. The presence of the portable computerized device at the designated location is verified based on the location identification tokens and the current location signature.

20 Claims, 5 Drawing Sheets

(56) References Cited

U.S. PATENT DOCUMENTS

| | | | |
|---|---|---|---|
| 8,321,922 | B1 | 11/2012 | Lo et al. |
| 8,347,400 | B2 | 1/2013 | Zuniga et al. |
| 8,570,172 | B2 | 10/2013 | Al-Mahdawi |
| 8,953,570 | B2 | 2/2015 | Lin et al. |
| 9,016,562 | B1 | 4/2015 | Tredoux et al. |
| 9,515,836 | B2 * | 12/2016 | Tredoux ................ H04L 9/3297 |
| 2007/0188342 | A1 | 8/2007 | Valeriano et al. |
| 2009/0151002 | A1 | 6/2009 | Zuniga et al. |
| 2010/0299527 | A1 | 11/2010 | Arunan et al. |
| 2011/0313922 | A1 | 12/2011 | Ben Ayed |
| 2012/0143495 | A1 | 6/2012 | Dantu |
| 2012/0202423 | A1 | 8/2012 | Tiedemann et al. |
| 2012/0290254 | A1 | 11/2012 | Thrun et al. |
| 2013/0104238 | A1 * | 4/2013 | Balsan ................ G06Q 30/0207 |
| | | | 726/26 |
| 2013/0132282 | A1 | 5/2013 | Shakkarwar |
| 2013/0185213 | A1 | 7/2013 | Insanic |
| 2013/0303085 | A1 | 11/2013 | Boucher et al. |
| 2014/0286491 | A1 | 9/2014 | Atherton |
| 2014/0292496 | A1 | 10/2014 | Tredoux et al. |
| 2015/0172059 | A1 | 6/2015 | Tredoux et al. |
| 2015/0304435 | A1 * | 10/2015 | Bravo .................... H04L 67/18 |
| | | | 726/7 |
| 2016/0021091 | A1 * | 1/2016 | Hoyer .................. H04W 12/06 |
| | | | 726/9 |

* cited by examiner

SYSTEM AND METHOD FOR PROVING PHYSICAL PRESENCE

BACKGROUND

Systems and methods herein generally relate to security devices and, more particularly, to mobile devices for automatically detecting and recording the physical presence of the mobile device at a designated location.

Many applications exist where it is valuable to be able to detect and prove physical presence of users. Examples include the healthcare industry, plant maintenance, and physical security providers. Current solutions use systems requiring an overt act by the user such as punching a code into a station, swiping a card at a reader, or making an entry in a log.

Tags or identification codes can be maintained in wireless devices that can be read by equipment such as near field communication systems (NFC), radio frequency identification systems (RFID), short-wave radio systems; optical systems (barcodes, quick reference codes (QR), etc.), or similar systems. Such identification codes are commonly used to identify equipment and features or provide other information that is location-sensitive. Devices, such as smartphones, can read machine-readable tags.

SUMMARY

Many applications exist where it is valuable to be able to detect and prove physical presence of users who are carrying mobile devices, without requiring actual physical contact with features of that location, such as tags. An application on the mobile device records the tokens transmitted to it by several wireless tags that are within range. Later, the user/mobile presents those tokens as proof of physical presence at the designated location.

According to a portable computerized device, the portable computerized device comprises a memory, a wireless receiver, a processor, and a communications device. The wireless receiver simultaneously receives a first location identification token from a first location transmitting device and a second location identification token from a second location transmitting device while the portable computerized device is within a predetermined distance from a designated location. The processor is operatively connected to the wireless receiver and automatically obtains a previously stored location signature associated with the first location identification token and the second location identification token from a non-transitory computer readable storage medium, using the wireless receiver. The processor automatically calculates a current location signature based on the first location identification token and the second location identification token. The processor automatically compares the current location signature with the previously stored location signature to determine a similarity measure of the current location signature and the previously stored location signature. The processor stores the first location identification token, the second location identification token, and the current location signature in the memory. The communications device is operatively connected to the processor. The communications device transmits the current location signature to a server as proof of presence of the portable computerized device at the designated location, using the processor.

According to a system herein, the system comprises a server, a first wireless location transmitting device transmitting a first location identification token, a second wireless location transmitting device transmitting a second location identification token, and a portable computerized device having computer-executable instructions. The portable computerized device comprises a memory, a wireless receiver simultaneously receiving the first location identification token from the first location transmitting device and the second location identification token from the second location transmitting device while the portable computerized device is within a predetermined distance from a designated location. A processor is operatively connected to the wireless receiver. The processor stores the first location identification token and the second location identification token in the memory. A communications device is operatively connected to the processor. The computer-executable instructions cause the processor to automatically obtain a previously stored location signature associated with the first location identification token and the second location identification token from a non-transitory computer readable storage medium, using the communications device. The processor automatically calculates a current location signature based on the first location identification token and the second location identification token. The processor automatically compares the current location signature with the previously stored location signature to determine a similarity measure of the current location signature and the previously stored location signature. The processor transmits the first location identification token, the second location identification token, and the current location signature to the server, using the communications device, as proof of presence of the portable computerized device at the designated location.

According to a method herein, a first location identification token is received from a first location transmitting device, using a wireless receiver of a portable computerized device, while the portable computerized device is within a predetermined distance from a designated location. A second location identification token is simultaneously received from a second location transmitting device, using the wireless receiver of the portable computerized device. A current location signature is automatically calculated based on the first location identification token and the second location identification token. A previously stored location signature associated with the first location identification token and the second location identification token is automatically obtained from a non-transitory computer readable storage medium, using a communications device of the portable computerized device. The current location signature is automatically compared with the previously stored location signature to determine a similarity measure of the current location signature and the previously stored location signature. The first location identification token, the second location identification token, and the current location signature is automatically stored in a memory of the portable computerized device. The first location identification token, the second location identification token, and the current location signature are transmitted to a server, using the portable computerized device. The presence of the portable computerized device at the designated location is verified based on the first location identification token, the second location identification token, and the current location signature.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

For a general understanding of the features of the disclosure, reference is made to the drawings. It will be readily understood that the systems and methods of the present disclosure, as generally described and illustrated in the drawings herein, may be arranged and designed in a wide variety of configurations in addition to the systems and methods described herein. In the drawings, like reference numerals have been used to identify identical elements. While the disclosure will be described hereinafter in connection with specific systems and methods thereof, it will be understood that limiting the disclosure to such specific systems and methods is not intended. Thus, the following detailed description of the systems and methods, as represented in the drawings, is not intended to limit the scope defined by the appended claims. On the contrary, it is intended to cover all alternatives, modifications, and equivalents as may be included within the spirit and scope of the disclosure as defined by the appended claims.

The systems and methods herein use a mobile device's receiver to receive and record tokens transmitted to it by a plurality of wireless tags that are within its range. Later the systems and methods herein use the mobile device's transmitter to present those tokens as proof of physical presence within the range of the wireless tags. For purposes herein, a "tag" or "tag identifier" refers to any machine-readable item containing data or codes, such as near field communication systems (NFC), radio frequency identification systems (RFID), Bluetooth® systems, optical systems (barcodes, quick reference codes (QR), etc.), or similar systems.

When the tag is initially placed into service, a mobile device reads the tag identifier, e.g. using NFC or optical systems, and simultaneously obtains a number of other tags detected by the mobile device. The systems and methods herein use such tag identifiers to calculate a location signature that is then associated with specific groups of tag. Recording both the tag identifiers and the location signature, locally on the mobile or in a server, allows later verification that a subsequent portable device is in the correct location by matching the current location signature against the previously stored location signature associated with the tag identifiers.

Tags that can be read by mobile devices have many applications. The tags take multiple forms, such as NFC/RFID tags, or Bluetooth® tags, or printed tags like QR codes or other visually encoded forms. The tags may be read-only, or both readable and writeable. Such tags have unique identifiers that can be read. Typically, such tags are used for identification purposes when affixed to a position or object, and if additional assumptions are made about the fixity of their location, to infer that the user is in a definite spot when reading them.

One prominent kind of tag is the rewritable passive NFC tag. The reader and writer of such tags has to be physically close to the tag (say, less than 1 meter or similar distance limit) and the tag is passive in that the reader/writer supplies the power source, so that the tag can be affixed externally or internally without any other integration to a broad range of objects or places. According to systems and methods herein, NFC tags are disfavored since their location is inherently known.

Multiple tags may be placed into service in a location where proof of physical presence may be required, such as a hospital, warehouse, or secured facility. The mobile device reads the tag identifier, e.g., using short-wavelength UHF radio waves and simultaneously obtains a token from a number of tags detected by the mobile device. Such short-wavelength UHF radio may be in the ISM band from 2.4 to 2.485 GHz. The systems and methods herein use such tokens to determine a time of receipt and identification of additional chained tags associated with that specific tag. Recording both the tag identifier and the token, locally on the mobile device, allows later verification that the token was received at the location where the proof of physical presence was required.

The systems and methods herein provide assurance that a tag has not been moved or switched with some other tag from a different location. This prevents attempts to fool the user or the surrounding system using such a tag, say by misleadingly referring to a location that was not intended.

In an oversimplified example, with systems and methods herein, multiple tags are affixed in locations that are hard to locate physically. These may be devices or objects, or anything else to which a tag can be affixed, such as doors, lights, walls, and so on. Typically, the tags have a power supply, such as a battery, for example, for a transmitter. Variation of the transmission power makes locating the tags more difficult. The mobile device should be capable of reading identifiers from two or more tags at a time. Data received from the tags/transmitters is used to create a composite location signature, as described in further detail below. The mobile device can record the tokens received from the tags as the location signature (either locally using its own storage, or remotely on a server) and, at the same time, indicate the physical location where the tokens were received.

After the tag is initially affixed (or activated) and the location signature is established, each time a user approaches a location containing a tag, the tag allows the user to verify whether the tag is in the appropriate location while also verifying the physical presence of the user. To do so, the user can employ an application (app), which is a set of computer instructions causing the processor of the user's mobile device to execute some or all of the instructions. In this example, the app would cause the processor of the mobile device to obtain the token from two or more tags, record data from the tags, and calculate a current location signature. The app may also identify all the other tokens that are visible to each tag.

The app then causes the processor of the portable computerized device to compare the current location signature with the previously stored location signature and determines a similarity measure of the current location signature and the previously stored location signature. The app then causes the processor to store the first location identification token, the second location identification token, and the current location signature in the memory.

Storing the associated location signatures on a server (or other common-access storage location) has the advantage of allowing portable computerized devices to collaborate in establishing and refining the security for the location signatures. For example, every time a mobile device utilizes the tag, the time/date stamp will change and other sequence numbers and cryptographic schemes may be changed, as well.

The app allows the processor of the portable computerized device to present the tokens immediately to a central service, such as a cloud-based service, or later to a local server. The app allows the communications device of the portable computerized device to transmit the current location signature to a server as proof of presence of the portable computerized device at the designated location, using the processor.

The token and location information may also be presented to the user through the user interface of the mobile device to allow the user to act on the information given. The systems and methods herein thus provide the user accurate information about the probability that the tag was moved.

The information regarding whether a tag is in the correct location calculated by the systems and methods herein is only relative, and can be based solely upon the tokens obtained from the associated tags, and does not need to be based on any specific geographic location information. This is contrasted to positioning systems such as GPS, which establish a geographic location that is comparable to other geographic locations on the longitude and latitude scales. Unobstructed access to satellite signals, which is problematic inside covered areas, makes it difficult to obtain accurate GPS-based geographic locations within buildings. The systems and methods herein use a much broader and more flexible determination of "location" which does not need to be comparable except in the sense that each token is separate.

As noted above, various methods herein obtain two or more coded location identification tokens from location transmitting tags, using a wireless reader of a portable computerized device, while the portable computerized device is within a predetermined distance from a designated location. Such methods automatically store the location identification tokens in a memory of the portable computerized device. The location identification tokens are interpreted and presented to a server. The presence of the portable computerized device at the designated location is verified based on the location identification tokens.

Also, such methods automatically obtain a previously stored location signature associated with the tags from a non-transitory computer readable storage medium, using a communications device of the portable computerized device. Further, such methods automatically compare the current location signature with the previously stored location signature to determine a similarity measure of the current location signature and the previously stored location signature, using the processor. These methods automatically verify whether the portable computerized device is in the correct location based on the similarity measure being above a predetermined threshold, using the processor. Such methods can also display a location validity message on a user interface of the portable computerized device based on the process of verifying whether the portable computerized device is in the correct location.

Figure 1:
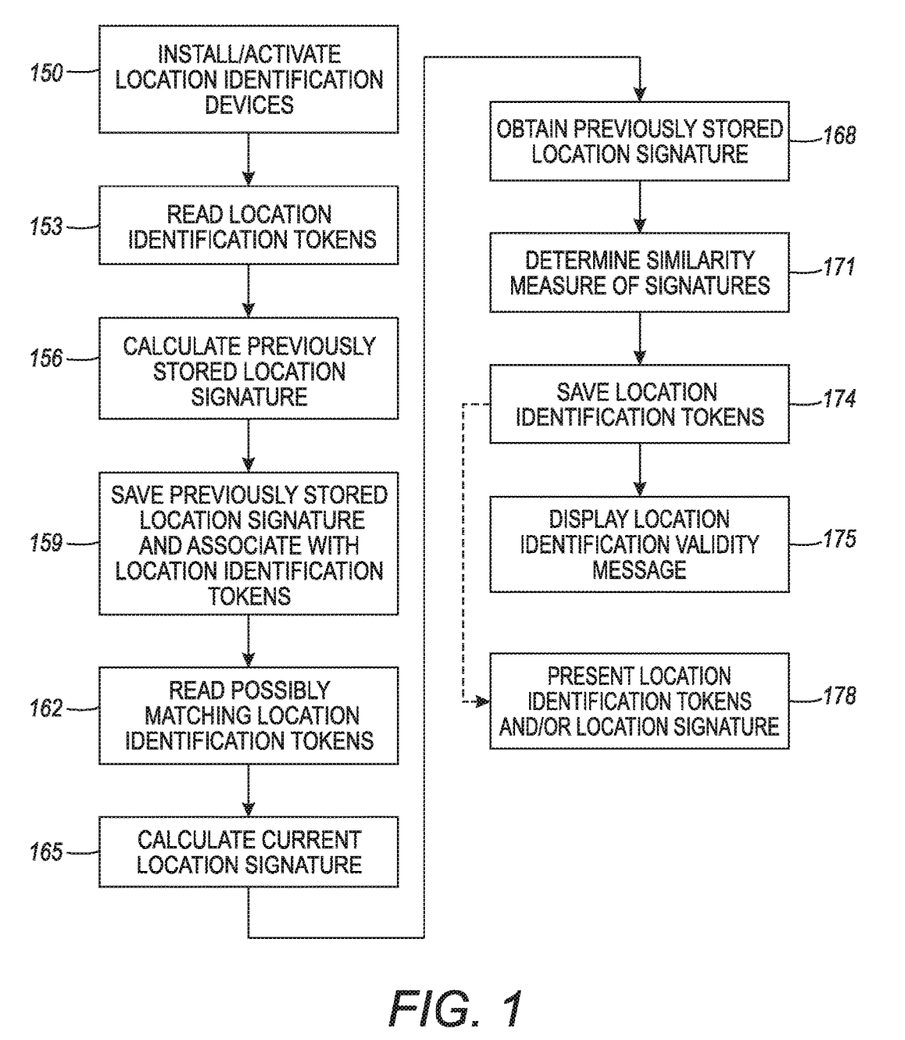
FIG. 1 is a flow diagram of methods herein.

FIG. 1 is flowchart illustrating exemplary methods herein. In item 150, these methods install or activate two or more location transmitting devices in a designated location where physical presence is required. The location transmitting devices can comprise short-wavelength UHF radio transmitters, for example, a Bluetooth® device, particularly, a Bluetooth Low Energy (BLE) device.

These methods read a location identification token (sometimes referred to herein as a "tag") from the location transmitting devices using a first wireless reader of a first portable computerized device. For example, the arbitrarily named "first" portable computerized device can be a smart phone or PDA of an administrator or service engineer who is performing the initial setup of the location transmitting devices. The location identification token will be read while the first portable computerized device is positioned at a location that is within a predetermined distance (e.g., 5 meters, 10 meters, etc.) from the location transmitting devices item 153. Some protocols, such as Near Field Communication (NFC) require that the portable device be very close (less than 1 meter), while other protocols such as Bluetooth® or Wi-Fi allow greater distances. Accordingly, NFC is not preferred.

In item 156, these methods automatically calculate a location signature based on the location identification tokens obtained using the first wireless reader of the first portable computerized device. The location signature is calculated using a first processor of the first portable computerized device.

Then, in item 159, such methods can automatically save the location signature (referred to herein as the "previously stored" location signature, for convenience) in a non-transitory computer readable storage medium (computer storage) using a first communications device of the first portable computerized device. The process of storing the location signature in item 159 also includes a process of associating the previously stored location signature with the location identification tokens (tags) (thereby allowing identification of the previously stored location signature to retrieve the location identification tokens, and vice versa). This completes the initial setup process for the location identification devices.

Once the initial setup process is complete, users will want to use the location identification devices to prove their physical presence in a designated location. Therefore, these methods then read a possibly matching location identification tokens from two or more location identification transmitting devices in item 162, using a second wireless reader of a second portable computerized device, while the second portable computerized device is positioned at a second location that is also within the predetermined distance from the designated location.

In item 165, these methods use the second portable computerized device and automatically calculate a current location signature based on the location identification tokens, using a second processor of the second portable computerized device.

Such methods also automatically obtain the previously stored location signature associated with the possibly location identification tokens from the non-transitory computer readable storage medium in item 168, using a second communications device of the second portable computerized device.

Thus, these methods can automatically compare the current location signature with the previously stored location signature to determine a similarity measure of the location signatures (of the current location signature and the previously stored location signature) in item 171, using the second processor.

Then, in item 174, such methods can automatically save the location identification tokens in a non-transitory computer readable storage medium (computer storage) using a communications device of the portable computerized device. Such methods allow the location identification tokens and/or current location signature to be presented immediately to a central service, such as a cloud-based service, or later to a local server, in item 178.

Further, such methods can display a location validity message on a user interface of the portable computerized device based on the process of verifying the location identification tokens and determining that the portable computerized device is in the correct location in item 175.

Figure 2:
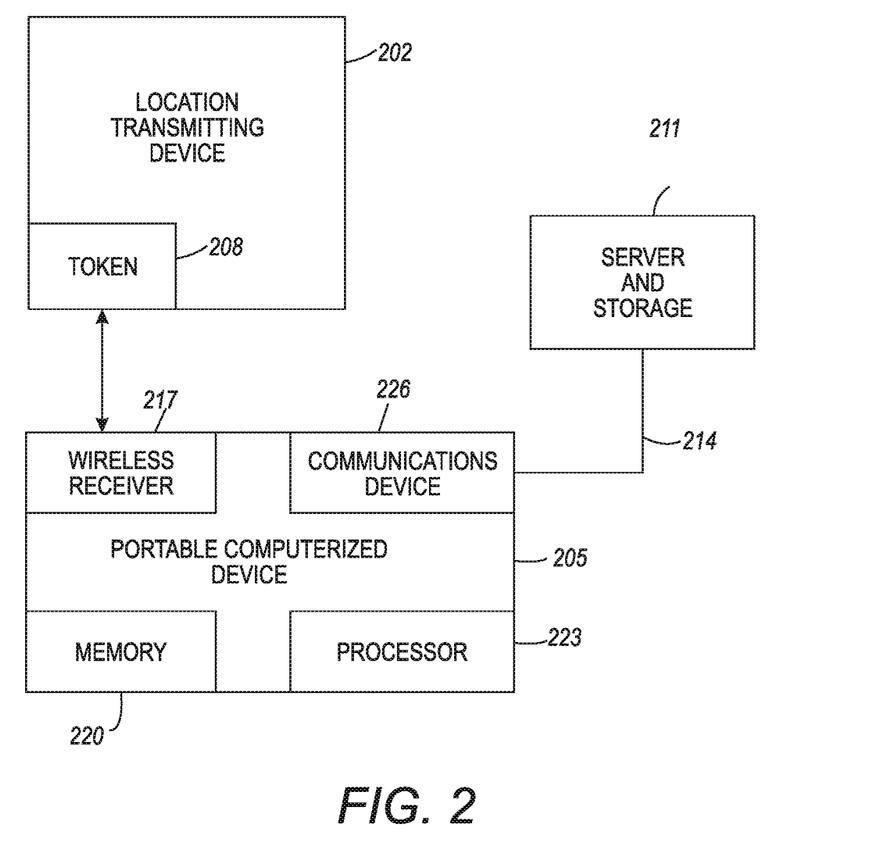
FIG. 2 is a schematic diagram illustrating devices herein.

As shown in FIG. 2, a location transmitting device 202 is installed in a location where physical presence in the location must be verified. Typically, a plurality of location transmitting devices 202 may be used. A portable computerized device 205 within a predetermined distance of a location transmitting device 202 receives a token 208 transmitted by the location transmitting device 202. FIG. 2 also illustrates a server 211 (having storage) connected to the portable computerized device 205 by way of a wired or wireless network 214.

Further, the portable computerized device 205 includes a wireless receiver 217 that can receive the token 208 from the location transmitting device 202, as discussed above, a memory 220 to store the token 208, a processor 223 operatively connected to the wireless receiver 217, and a communications device 226 is operatively connected to the processor 223.

An application on the mobile device records the token 208 transmitted to it by several wireless tags that are within range. Later, the user with a portable computerized device 205 presents those tokens 208 as proof of physical presence.

The tokens can utilize a cryptographic scheme to prevent replay, so that the user must be at the physical location where such tokens are visible in order to prove physical presence there at the given time. Recording and repeating previously seen tokens is not possible. Each tag signs its token using a private key (PK) embedded securely in the tag using known techniques such as tamper resistant hardware. An example signed token scheme is shown below:

SK(tag id, timestamp, salt, sequence number, additional chained tokens)

The token contains the current timestamp, a random cryptographic salt, and a sequence number (chained tokens are explained below). The signed token can then be verified by using the corresponding public key (PK). Thus each signed token is unique and attempts to proffer duplicates are easily detected. Note that other encryption schemes may be used instead.

Figure 3:
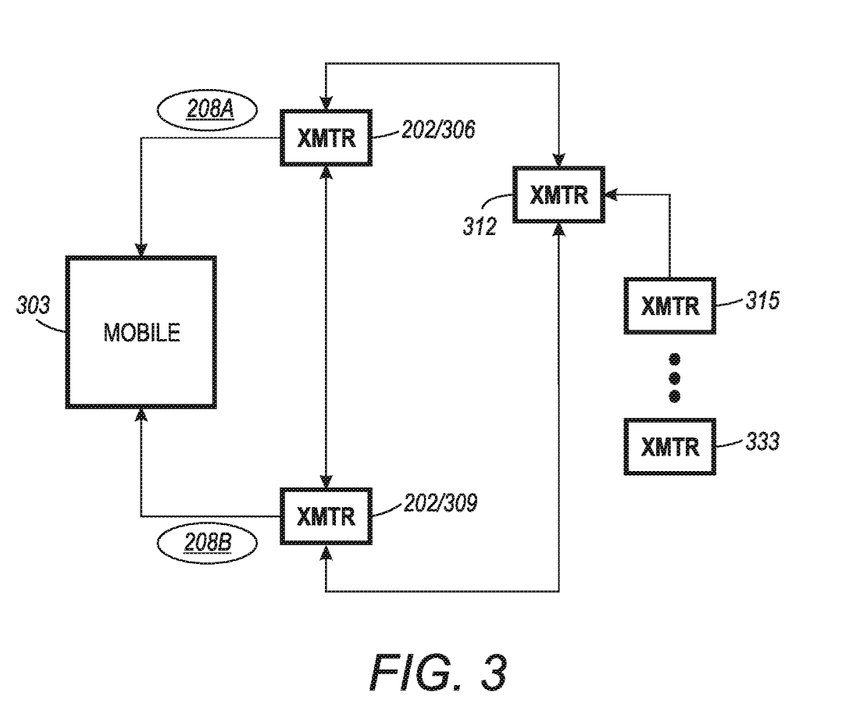
FIG. 3 is a schematic diagram illustrating systems herein.

Referring to FIG. 3, a mobile device 303 receives a location identification token from each location transmitting device (indicated as tags 306, 309) within range of the mobile device 303. As shown in FIG. 3, two tags 306, 309 are directly visible to the mobile device 303. A wireless protocol such as Bluetooth Low Energy (BLE) may be used to transmit the tokens. The mobile device 303 must only be within an approximate physical location, such as a building floor or within an entire building, and physical contact is not required, nor does the user know precisely where the tags actually are located. According to systems and methods herein, tag 306 is visible to tag 309, and vice-versa. In addition, tag 312 may be visible to tags 306, 309, but out of range of the mobile device 303.

The systems and methods herein address an important security concern by making it difficult for a malfeasor to locate the tags/transmitters. If a scheme such as BLE is used, the signal strength of the tags 306, 309 may be used to attempt to physically locate it, and then move it, transporting it to some other location. Such a change would effectively defeat the physical location guarantees given, since the user/mobile may still receive tokens from the tags 306, 309, without actually being where the tag was supposed to be. Because the tags are hard to locate physically, they have advantages over NFC tags, which are inherently physically accessible to the user.

The system and methods herein disclose the use of several techniques to raise the cost, in time and energy, in locating and moving tags:

1. Randomly varying transmission power of the tags 306, 309 when the wireless signals are emitted, to frustrate use of the signal strength to attempt to determine the location of the tag.
2. Allows requiring visibility of more than one token so that moving one tag would not be sufficient, the malefactor would have to move as many as are required for that location by the particular installation. Since these tags are used within a mesh the movement of one or more tags 306, 309, 312 may affect the signature required for more than one location.
3. Tag chaining, so that each tag 306, 309 includes in its broadcast token all the other tokens that are visible to it, recursively, establishing a chain of reference over an entire facility, which can stretch far beyond the immediate physical environment of the user, such as tags 315 . . . 333, etc. A subset of visible tags may be used to reduce bandwidth costs of transmitting this information, using a statistical sampling technique. The combined tags form a mesh of tags.

Use of these techniques also raises the probability of detection if any user attempts to compromise the system, since significant physical intervention by the user would be required to gain access to all the tag locations. Systems and methods herein comprehend that simpler deployments need not utilize all these elements and may settle for a subset that is good enough for the purposes at hand.

Many different types of token transmitters/tags may be used. According to systems and methods herein, the token transmitters/tags may employ different kinds of power sources and form factors. In addition, various alternative two-way communication systems may be used to transmit tokens issued and signed by a central service (such as by a cloud-based service) to the tags for counter-signature.

Figure 4:
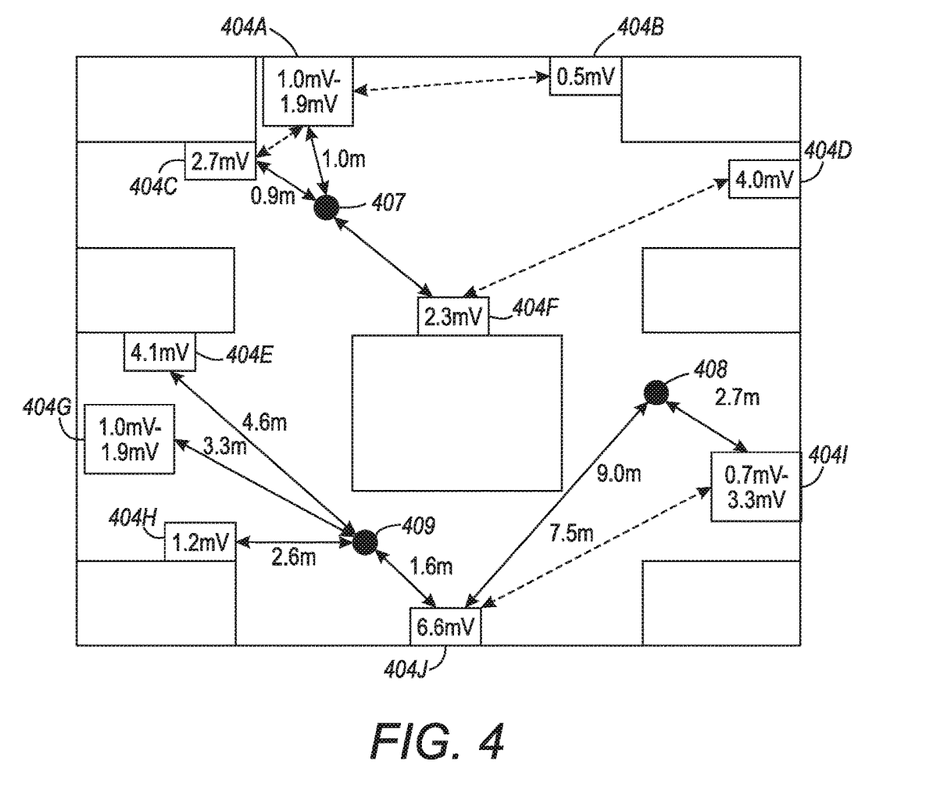
FIG. 4 is a plan view of room or building illustrating systems herein.

FIG. 4 shows an exemplary floor plan of room or building having several location transmitting devices 404A-J. Each of location transmitting devices 404A-J may comprise short-wavelength UHF radio transmitters having different power levels, as indicated. In some cases, the transmitting power may variable. During initial setup, the arbitrarily named first portable computerized device can establish a location signature at specific designated locations, such as indicated at 407, 408, and 409. For example, location 407 may be visible to location transmitting devices 404A, 404C, and 404F; location 408 may be visible to location transmitting devices 404I and 404J; and location 409 may be visible to location transmitting devices 404E, 404G, 404H, and 404J. Note-location transmitting device 404B may not have enough power to be visible at location 707.

According to systems and methods herein, the location signature uses at least two location transmitting devices. The tokens from each location transmitting device may include other location transmitting device in its tag chain. For example, the token from location transmitting device 404A may indicate that it is visible to location transmitting devices 404B and 404C and the token from location transmitting device 404F may indicate that it is visible to location transmitting device 404D; although neither location transmitting device 404D or 404B may be visible at location 407.

Thus, as explained above, exemplary portable computerized devices herein comprise a wireless reader and memory that receives a token from a location identification device while the portable computerized device is positioned at a location that is within a predetermined distance from the machine. The portable computerized device stores the tokens in the memory. The portable computerized devices include a processor operatively connected to the memory. The processor automatically interprets each location identification token and identifies additional location transmittal devices based on the received information.

Figure 5:
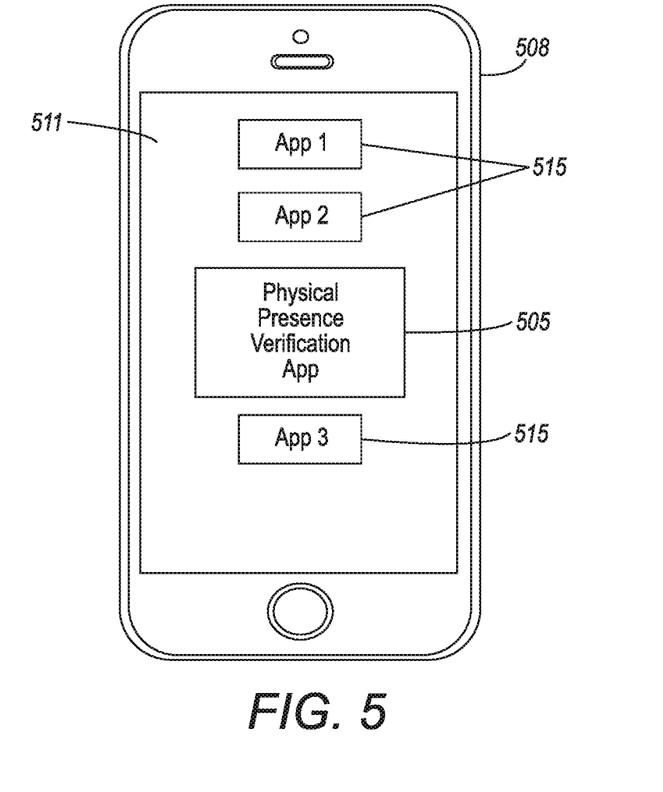
FIG. 5 is a schematic diagram illustrating an app herein operating on a portable computing device.

As shown in FIG. 5, systems and methods herein provide a physical presence verification app 505 that can be downloaded (e.g., from an app store) to the user's portable computing device 508. As shown in FIG. 5, the physical presence verification app 505 can be displayed on the user interface 511 of the user's portable computing device 508 along with other apps 515.

When the physical presence verification app 505 in FIG. 5 is selected by the user, the app 505 causes the user interface 511 of the user portable computing device to display a screen having menu options to begin physical presence verification, display a location validity message, transmit the current location signature to a server, etc.

Also, the portable computerized devices include a communications device operatively connected to the processor. The communications device transmits the tokens to a server as proof of presence of the portable computerized device at the designated location.

The portable computerized devices further include a user interface operatively connected to the processor. The user interface displays a location validity message based on the processor determining that the location transmittal device is in the correct location.

Thus, exemplary systems herein comprise a server 211, a first wireless location transmitting device 306 transmitting a first location identification token 208A, a second wireless location transmitting device 309 transmitting a second location identification token 208B, and a portable computerized device 205/303 having computer-executable instructions. The portable computerized device 205/303 comprises a memory 220 and a wireless receiver 217 simultaneously receiving the first location identification token 208A from the first location transmitting device 306 and the second location identification token 208B from the second location transmitting device 309 while the portable computerized device 205/303 is within a predetermined distance from a designated location. A processor 223 is operatively connected to the wireless receiver 217. The processor 223 stores the first location identification token 208A and the second location identification token 208B in the memory 220. A communications device 226 is operatively connected to the processor 223. The computer-executable instructions cause the processor 223 to automatically interpret each location identification token 208 and identify additional location transmittal devices (312, 315, . . . , 333) based on information from one of the first location identification token 208A and the second location identification token 208B. The processor 223 transmits the first location identification token 208A and the second location identification token 208B to the server 211 as proof of presence of the portable computerized device 205/303 at the designated location.

In this manner, multiple tags are read to obtain proof of physical presence, while acquisition is passive, requiring no action by the user. An encryption scheme using a private key renders the distributed system tamper resistant. Furthermore, tag chaining fixes the location of multiple tags within a mesh of tags further rendering the system tamper resistant.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A portable computerized device, comprising:
   a memory;
   a wireless receiver simultaneously receiving a first location identification token from a first location transmitting device and a second location identification token from a second location transmitting device while said portable computerized device is within a predetermined distance from a designated location;
   a processor operatively connected to said wireless receiver,
      said processor automatically obtaining a previously stored location signature associated with said first location identification token and said second location identification token from a non-transitory computer readable storage medium, using said wireless receiver,
      said processor automatically calculating a current location signature based on said first location identification token and said second location identification token,
      said processor automatically comparing said current location signature with said previously stored location signature to determine a similarity measure of said current location signature and said previously stored location signature, and
      said processor storing said first location identification token, said second location identification token, and said current location signature in said memory; and
   a communications device operatively connected to said processor, said communications device transmitting said current location signature to a server as proof of presence of said portable computerized device at said designated location, using said processor.

2. The portable computerized device according to claim 1, said wireless receiver comprising a short-wavelength UHF radio receiver.

3. The portable computerized device according to claim 1, each of said first location identification token and said second location identification token comprising:
   a tag identification; and
   a timestamp.

4. The portable computerized device according to claim 3, each of said first location identification token and said second location identification token further comprising a cryptographic scheme comprising a random cryptographic salt and a sequence number.

5. The portable computerized device according to claim 1, said processor automatically interpreting each location identification token and identifying additional location transmittal devices based on information from one of said first location identification token and said second location identification token.

6. The portable computerized device according to claim 1, further comprising:
   a user interface operatively connected to said processor, said user interface displaying a current location identification validity message based on said similarity measure being above a predetermined threshold.

7. A system, comprising:
   a server;
   a first wireless location transmitting device transmitting a first location identification token;
   a second wireless location transmitting device transmitting a second location identification token; and
   a portable computerized device having computer-executable instructions, said portable computerized device comprising:
      a memory,
      a wireless receiver simultaneously receiving said first location identification token from said first wireless location transmitting device and said second location identification token from said second wireless location transmitting device while said portable computerized device is within a predetermined distance from a designated location,
      a processor operatively connected to said wireless receiver, said processor storing said first location identification token and said second location identification token in said memory, and
      a communications device operatively connected to said processor;
   said computer-executable instructions causing:
      said processor to automatically obtain a previously stored location signature associated with said first location identification token and said second location identification token from a non-transitory computer readable storage medium, using said communications device,
      said processor to automatically calculate a current location signature based on said first location identification token and said second location identification token,
      said processor to automatically compare said current location signature with said previously stored location signature to determine a similarity measure of said current location signature and said previously stored location signature, and
      said processor to transmit said first location identification token, said second location identification token and said current location signature to said server, using said communications device, as proof of presence of said portable computerized device at said designated location.

8. The system according to claim 7, said processor storing said first location identification token, said second location identification token, and said current location signature in said memory.

9. The system according to claim 7, said first wireless location transmitting device and said second wireless location transmitting device comprising a short-wavelength UHF radio transmitters.

10. The system according to claim 7, said wireless receiver comprising a short-wavelength UHF radio receiver.

11. The system according to claim 7, each of said first location identification token and said second location identification token comprising:
   a tag identification; and
   a timestamp.

12. The system according to claim 7, each of said first location identification token and said second location identification token further comprising a cryptographic scheme comprising a random cryptographic salt and a sequence number.

13. The system according to claim 7, said portable computerized device further comprising:
   a user interface operatively connected to said processor, said user interface displaying a current location identification validity message based on said similarity measure being above a predetermined threshold.

14. A method comprising:
   receiving a first location identification token from a first location transmitting device, using a wireless receiver of a portable computerized device, while said portable computerized device is within a predetermined distance from a designated location;
   simultaneously receiving a second location identification token from a second location transmitting device, using said wireless receiver of said portable computerized device;
   automatically calculating a current location signature based on said first location identification token and said second location identification token;
   automatically obtaining a previously stored location signature associated with said first location identification token and said second location identification token from a non-transitory computer readable storage medium, using a communications device of said portable computerized device;
   automatically comparing said current location signature with said previously stored location signature to determine a similarity measure of said current location signature and said previously stored location signature;
   automatically storing said first location identification token, said second location identification token, and said current location signature in a memory of said portable computerized device;
   transmitting said first location identification token, said second location identification token, and said current location signature to a server, using said portable computerized device; and
   verifying presence of said portable computerized device at said designated location based on said first location identification token, said second location identification token, and said current location signature.

15. The method according to claim 14, further comprising:
   displaying a current location identification validity message on a user interface of said portable computerized device based on said similarity measure being above a predetermined threshold.

16. The method according to claim 14, said first location transmitting device and said second location transmitting device comprising short-wavelength UHF radio transmitters.

17. The method according to claim 14, said wireless receiver of said portable computerized device comprising a short-wavelength UHF radio receiver.

18. The method according to claim 14, each of said first location identification token and said second location identification token comprising:
   a tag identification; and
   a timestamp.

19. The method according to claim 14, further comprising coding each of said first location identification token and said second location identification token using a cryptographic scheme comprising using a random cryptographic salt and a sequence number.

20. The method according to claim 14, further comprising:
   receiving a list of additional location transmittal devices visible to one of said first location transmitting device and said second location transmitting device from at least one of said first location identification token and said second location identification token.

* * * * *